United States Patent Office 3,302,280
Patented Feb. 7, 1967

3,302,280

METHODS OF BONDING SECONDARY MATERIALS TO BERYLLIUM-COPPER

Jerry C. La Plante, Bayside, N.Y., assignor to Alloys Unlimited Inc., Long Island City, N.Y., a corporation of New York No Drawing. Filed May 15, 1964, Ser. No. 367,878
5 Claims. (Cl. 29—475)

This invention relates to means and methods for bonding and cladding the metals onto beryllium-copper.

This invention provides means and methods for bonding metals, for instance, low resistance contact materials such as silver, silver alloys, platinum, copper and gold onto a beryllium-copper strip. This process is useful in making electrical contacts such as described in my copending application, Serial No. 361,821, entitled: Electrical Contacts In Manufacture, filed April 22, 1964.

One of the problems with producing clad beryllium-copper in the past has been that plater bar techniques have been used. To those acquainted with the art, it will be apparent that cladding beryllium-copper by these techniques limits the annealing temperature of the clad material to approximately 1300°–1350° F. This is because the silver brazing alloys must melt and flow at a temperature below the solidus of the beryllium-copper and the available materials therefore melt in the range of 1000°–1350° F.

Also, specifically, in the cladding of gold or gold alloys, there is the danger of formation of gold beryllium compounds which form eutectics at 1076° F. at 1116° F. which obviously preclude annealing the material at a higher temperature. As is well known to those acquainted with the art, it is necessary to anneal beryllium-copper in the range of 1400°–1500° F. in order to produce a material which can be fully heat treated to a high hardness. Since this is the major advantage of beryllium-copper, it becomes apparent that the previous cladding techniques are not feasible in producing a material which is generally usable to the industry.

It is a principal object of this invention to provide means and methods for producing materials which can be annealed in the range of 1350°–1500° F. and therefore can be subsequently heat treated in the usual manner of handling beryllium-copper.

Accordingly, a principal object of the invention is to provide new and improved methods of cladding beryllium-copper.

Another object of the invention is to provide new and improved clad beryllium-copper materials.

Another object of the invention is to provide new and improved processes for bonding contact materials on beryllium-copper.

Another object of the invention is to provide new and improved methods wherein low resistance material is bonded to and inlaid in a base strip of beryllium-copper.

Another object of the invention is to provide new and improved materials for making electrical contacts wherein the contact material is overlaid and bonded onto the base strip of beryllium-copper.

Another object of the invention is to provide new and improved means and methods for bonding gold to a beryllium copper base strip.

These and other objects will be apparent from the following specification:

The general methods for bonding to beryllium-copper are those, for instance hot rolling, which are generally known to the art for bonding of other materials. However, the prime invention herein is the recognition of the fact and choice of materials so that the materials brought into contact with the beryllium-copper and making up part of the bond or clad must be of such a nature that they do not produce low melting compounds or alloys with either the copper or the beryllium or the beryllium-copper alloy itself. By low melting we may consider any material formed which melts below a temperature of 1400° F. As an example, in applying gold or gold alloys to beryllium-copper, I provide an intermediate layer, as for instance, of nickel, silver, copper or equivalent. This intermediate layer will prevent diffusion between the beryllium-copper and the gold so as to prevent formation of the gold beryllium low melting alloys.

It is understood in this invention that clad materials of an overlay or inlay type may be produced. Examples may be as follows:

(1) An inlay can be produced as follows: The beryllium-copper is taken in a bar form, as for instance, from .100–.500″ thick. A slot is milled out for the inlay. The bar is then etched or cleaned mechanically, as for instance, in nitric acid to remove oxides or using sanding techniques. The time of the etching is not critical. The inlay for instance of silver is then pressed into the slot. The bar with the inlaid material is then heated to a temperature of 1200°–1500° F. in a reducing or neutral atmosphere. The bar with the inlaid material is then hot rolled in a mill so that the thickness is reduced by at least 15% each pass through the mill. The bar may then be reduced to any final size desired by conventional rolling and annealing techniques.

The process of cladding beryllium-copper with gold base material comprises the steps of taking a strip or bar of beryllium-copper, milling a slot in said bar, etching said strip or bar, placing a piece of interliner into said slot, milling a slot in said interliner material, placing a piece of gold material into said interliner slot, heating said overlaid piece to a temperature of 1200 to 1400 degrees F., in a reducing atmosphere, hot rolling said overlaid piece to reduce the thickness to a predetermined thickness.

The interliner or boundary layer may be of any metal which does not melt below 1400° F. for instance, nickel, copper, silver, iron, platinum, or platinum group metals.

(2) The overlay process is as follows: A flat piece of beryllium-copper is etched, as for instance, in nitric acid or is mechanically cleaned, as for instance by sanding, to remove oxides. The time of etching is not critical. A piece of cladding material of the same size is then overlaid on the beryllium-copper. The overlay is welded around the edges, as for instance, by heliarc welding. The entire bar is then heated as above in a reducing or neutral atmosphere and is then hot rolled on a mill so that the thickness is reduced by at least 15% each pass through the mill. The material may then be reduced to whatever size is desired by conventional rolling and annealing techniques.

When the bonded material is gold, or gold alloy, an interliner material, as for instance, silver, nickel, copper, or equivalent will be used. The same thing will apply on the inlay process.

The metals which may be bonded to beryllium-copper by the above methods without the interliner include the following:

Silver, silver alloys, platinum, copper, or any other metal that does not melt 1400° F. when inlaid in or overlaid on beryllium-copper.

The metals which may be bonded using an interliner or intermediate layer are the following:

Gold or any other metal that does melt below 1400° F. when inlaid in or overlaid on beryllium-copper.

Therefore, the present invention proides new and improved clad beryllium-copper and process therefor.

Many modifications may be made by those who desire to practice the invention without departing from the scope thereof which is defined by the following claims.

I claim:

1. The process of cladding beryllium-copper comprising the steps of:
taking a bar of beryllium-copper,
milling a slot in said bar,
cleaning said bar by chemical or mechanical means,
placing a piece of low resistance metal into said slot,
heating said inlaid piece to a temperature of 1200 to 1500 degrees F., in a reducing or neutral atmosphere.
hot rolling said inlaid piece to reduce the thickness to a predetermined thickness.

2. The process as in claim 1 wherein said low resistance material is of the group including silver, silver alloys, platinum and copper.

3. The process of cladding beryllium-copper comprising the steps of:
taking a strip of beryllium-copper,
cleaning said strip by chemical or mechanical means,
placing a piece of low resistance metal over said strip, edge welding said strip and said piece,
heating said overlaid piece to a temperature of 1200 to 1500 degrees F., in a reducing atmosphere,
hot rolling said overlaid piece to reduce the thickness to a predetermined thickness.

4. The process of cladding beryllium-copper with gold base material comprising the steps of:
taking a strip or bar of beryllium-copper, milling a slot in said bar,
etching said strip or bar,
placing a piece of interliner metal into said slot,
milling a slot in said interliner material,
placing a piece of gold material into said interliner slot,
heating said overlaid piece to a temperature of 1200 to 1500 degrees F., in a reducing atmosphere,
hot rolling said overlaid piece to reduce the thickness to a predetermined thickness.

5. The process of cladding beryllium-copper comprising the steps of:
taking a strip of beryllium-copper,
etching said strip,
placing a piece of interliner metal over said strip,
placing a piece of low resistance metal over said interliner, edge welding said strip and said overlaid pieces,
heating said overlaid piece to a temperature of 1200 to 1500 degrees F., in a reducing atmosphere,
hot rolling said overlaid piece to reduce the thickness to a predetermined thickness.

References Cited by the Examiner

UNITED STATES PATENTS

| | | | |
|---|---|---|---|
| 2,941,282 | 6/1960 | Fromson | 29—195 |
| 2,961,762 | 11/1960 | Clark | 29—488 |

HYLAND BIZOT, *Primary Examiner.*